(12) United States Patent
Hooper

(10) Patent No.: US 12,326,197 B2
(45) Date of Patent: Jun. 10, 2025

(54) BI-DIRECTIONAL RELIEF VALVE

(71) Applicant: Joshua Hooper, Kennesaw, GA (US)

(72) Inventor: Joshua Hooper, Kennesaw, GA (US)

(73) Assignee: Unibloc Hygienic Technologies US, LLC, Chicago, IL (US)

( * ) Notice: Subject to any disclaimer, the term of this patent is extended or adjusted under 35 U.S.C. 154(b) by 123 days.

(21) Appl. No.: 18/117,582

(22) Filed: Mar. 6, 2023

(65) Prior Publication Data

US 2023/0366477 A1 Nov. 16, 2023

Related U.S. Application Data

(60) Provisional application No. 63/341,170, filed on May 12, 2022.

(51) Int. Cl.
*F16K 15/14* (2006.01)
*F16K 7/17* (2006.01)
*F16K 17/04* (2006.01)
*F16K 27/02* (2006.01)

(52) U.S. Cl.
CPC ...... *F16K 15/1441* (2021.08); *F16K 17/0453* (2013.01); *F16K 27/0209* (2013.01); *F16K 27/0236* (2013.01); *F16K 7/17* (2013.01); *Y10T 137/7888* (2015.04)

(58) Field of Classification Search
CPC . F16K 7/14; F16K 7/17; F16K 15/144; F16K 15/1441; F16K 15/145; F16K 15/1825; F16K 15/1845; F16K 15/202; F16K 17/0453; F16K 17/0466; F16K 17/0473; F16K 17/085; F16K 17/18; F16K 17/19; F16K 17/196; F16K 17/26; F16K 17/164; F16K 17/28; F16K 31/126; F16K 31/1262; F16K 31/1264; F16K 31/1266; F16K 99/0015; F16K 27/0209; F16K 27/0236; Y10T 137/7888
USPC ......... 137/493, 493.7, 493.8, 510, 526, 859; 251/331
See application file for complete search history.

(56) References Cited

U.S. PATENT DOCUMENTS

| | | | | |
|---|---|---|---|---|
| 24,416 | A * | 6/1859 | Tate | F16K 41/10 251/278 |
| 1,450,078 | A * | 3/1923 | Haunz | F16K 7/16 251/278 |
| 2,686,533 | A * | 8/1958 | Gratzmuller | F16K 17/085 92/99 |
| 3,083,943 | A * | 4/1963 | Stewart, Jr. | F16K 31/1266 D23/233 |
| 3,374,522 | A * | 3/1968 | Boteler | F16K 27/0236 29/890.129 |
| 3,473,443 | A * | 10/1969 | Mikkelsen | F16K 17/0406 91/437 |

(Continued)

*Primary Examiner* — Kenneth Rinehart
*Assistant Examiner* — Jonathan J Waddy
(74) *Attorney, Agent, or Firm* — Miller & Martin PLLC

(57) ABSTRACT

A bi-directional valve has an inlet with an outlet that may interchangeably applied to a pressure source and still operate properly. A spring applies a bias to a concave diaphragm against a cover plate in a non-relieving configuration to seal an inlet relative to an outlet. The cover plate may have ports with a shallower attack angle than prior art designs. Those ports may also have different shapes to facilitate significantly more flow permitting at least some better performance characteristics than prior art designs.

14 Claims, 16 Drawing Sheets

(56) References Cited

U.S. PATENT DOCUMENTS

| | | | | |
|---|---|---|---|---|
| 4,614,328 | A * | 9/1986 | Zeadman | F16K 31/0672 |
| | | | | 251/129.17 |
| 4,944,487 | A * | 7/1990 | Holtermann | F16K 31/06 |
| | | | | 251/129.17 |
| 4,949,750 | A * | 8/1990 | Goodwin | F16K 17/0453 |
| | | | | 137/859 |
| 5,265,645 | A * | 11/1993 | Goodwin | F16K 15/144 |
| | | | | 137/859 |
| 6,007,046 | A * | 12/1999 | Rothermel | F16K 7/14 |
| | | | | 251/129.17 |
| 6,685,165 | B1 * | 2/2004 | Kloehn | F16K 31/0655 |
| | | | | 251/84 |
| 7,780,785 | B2 * | 8/2010 | Chen | C23C 16/45525 |
| | | | | 156/345.33 |
| 9,476,510 | B2 * | 10/2016 | Buhler | F16K 31/0672 |
| 11,982,377 | B1 * | 5/2024 | Myers | F16K 99/0059 |
| 2016/0147234 | A1 * | 5/2016 | Leeser | F16K 7/17 |
| | | | | 137/596.12 |
| 2016/0209377 | A1 * | 7/2016 | Goto | F16K 7/16 |
| 2019/0024730 | A1 * | 1/2019 | Kim | F16D 48/02 |

* cited by examiner

BI-DIRECTIONAL RELIEF VALVE

CLAIM OF PRIORITY

This application claims the benefit of U.S. Patent Application No. 63/341,170 filed May 12, 2022, which is incorporated by reference herein in its entirety.

FIELD OF THE INVENTION

The present invention relates to a bi-directional relief valves and more particularly to bi-directional relief valve utilized with lobe pumps, if not integrated into lobe pumps, such as for traveling pump uses such as loading and unloading mobile tanks.

BACKGROUND OF THE INVENTION

Single direction relief valves and safety valves are well known in the industry. A relief valve has the purpose to limit pressure to no more than a specific pressure. A relief valve opens proportional to the pressure increase and opens when the pressure reaches a set pressure limit. Relief vales are typically not suitable to be utilized at a maximal over pressure values of 3% of maximum allowable working pressure (MAWP) or above.

Safety valves provide more of a fail-safe purpose and protect property, environment and people. Safety valves start opening before a set pressure and pop open at a defined point. It is important to remember that a safety valve starts opening before the set pressure limit. Safety valves can be used at maximal over pressure values of 3% of maximum allowable working pressure (MAWP) or above.

FIG. 1 shows a prior art positive displacement lobe pump 8 having an integrated bi-directional relief valve that has been sold by the applicant for a number of years. While that design relief valve works satisfactory in that construction, upon testing, it was discovered that improvements could be made over the original design.

Specifically, FIG. 2 shows the original design of the relief valve 1 which normally prevents flow between inlet 3 and an outlet 4 or visa versa. Spring 5 and plunger 6 normally utilized in combinations to prescribe a specific relief pressure for the valve. The spring biases against the diaphragm 2 so that upon reaching a desired pressure point, the diaphragm deflects in the direction 7 thereby permitting fluid communication between inlet and outlet 3 and 4. One of ordinary skill in the art quickly understands that such communication allows relief pressure with respect to the pump with inlets and outlets, 9 and 10 (or visa versa, depending on the direction the pump is being operated).

FIG. 3 is a single direction relief valve 11 of a common construction of prior art designs. The applicant tested the flow rate of the bi-directional relief valve 1 in FIG. 2 compared to that of the uni-directional valve 11 of FIG. 3 under relief conditions. The uni-directional valve 11 had a simulated flow rate of 62 cubic feet per minutes when the diaphragm average surface pressure was 60 psi and the relief valve 11 open. The prior art valve 1 had a flow rate of 21.2 cubic feet per minute which was about ⅓ of the traditional prior art relief valve 11. This is satisfactory under many conditions, but the applicant believes that improvements over this prior art design can be had.

The diaphragm 2 is shown in further detail in an exploded view of FIG. 4 as a laminated disc shaped component of PTFE and viton layers formed as a planar disc.

Improvements over the prior art designs are believed to be desirable for at least some applications.

FIGS. 6-9 show the prior art relief cover 12 used in the prior art bi-directional relief valve 1.

SUMMARY OF THE INVENTION

Consequently, it is an object of many embodiments of the present invention to provide an improved bi-directional relief valve.

It is another object of the present invention to provide an improved positive displacement pump or lobe pump with a bi-directional relief valve having higher flow rates than prior art designs during a relief event.

Accordingly, in accordance with a presently preferred embodiment of the present invention, the applicant has modified prior art relief cover plate 12 to provide improved flow paths under relief conditions.

A new relief cover plate has been substituted for the old relief cover plate providing a significantly greater flow that the prior art relief plate allow through an inlet and outlet 3 and 4. The angle of discharge has been also changed. The cross-sectional areas and shape have also been changed. Finally, a new diaphragm has been utilized with new geometry which has been found to deflect satisfactorily under relief condition to allow significantly more flow to proceed through the valve.

It is the object of many embodiments of the invention to utilize the remainder of the parts from the original valve, however, other embodiments may not be constrained by this limitation.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 10:
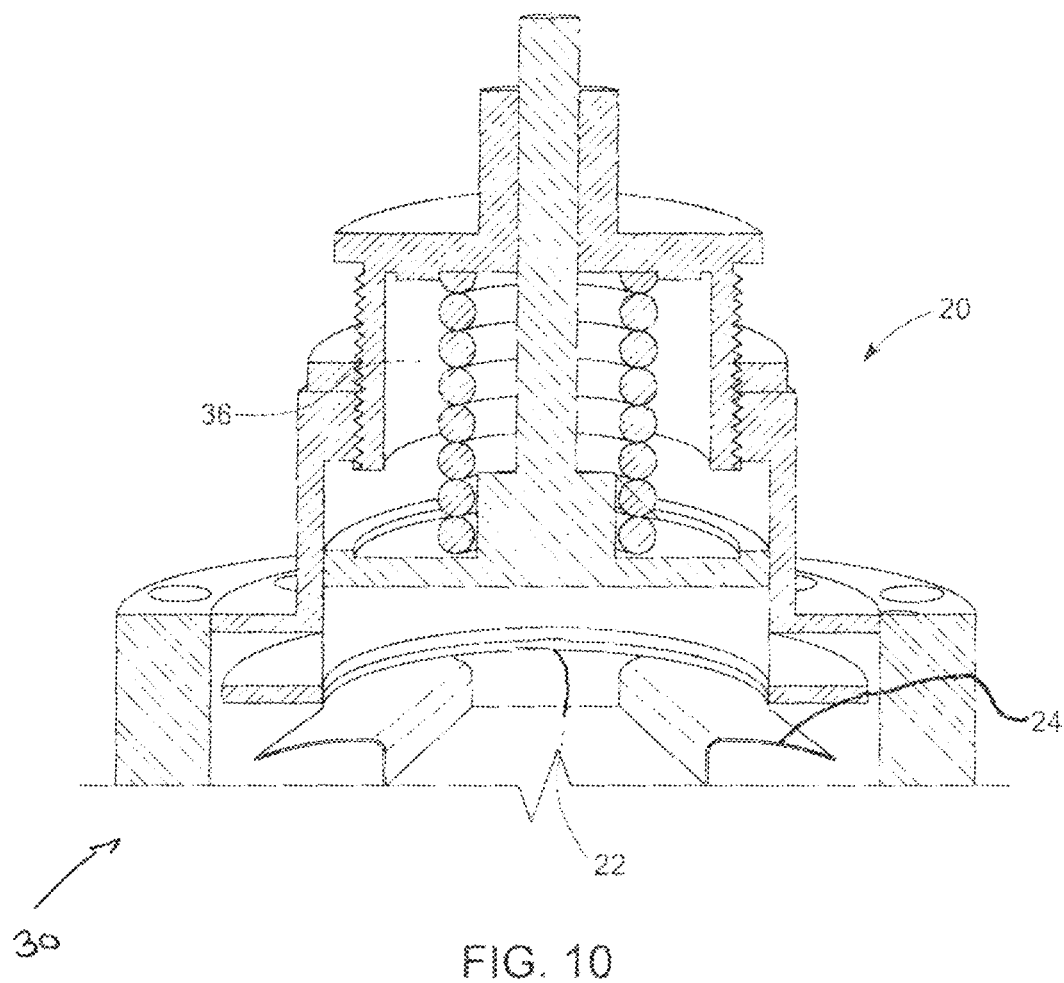
FIG. 10 is a cross-sectional view of a presently preferred embodiment of the present invention.
Figure 11:
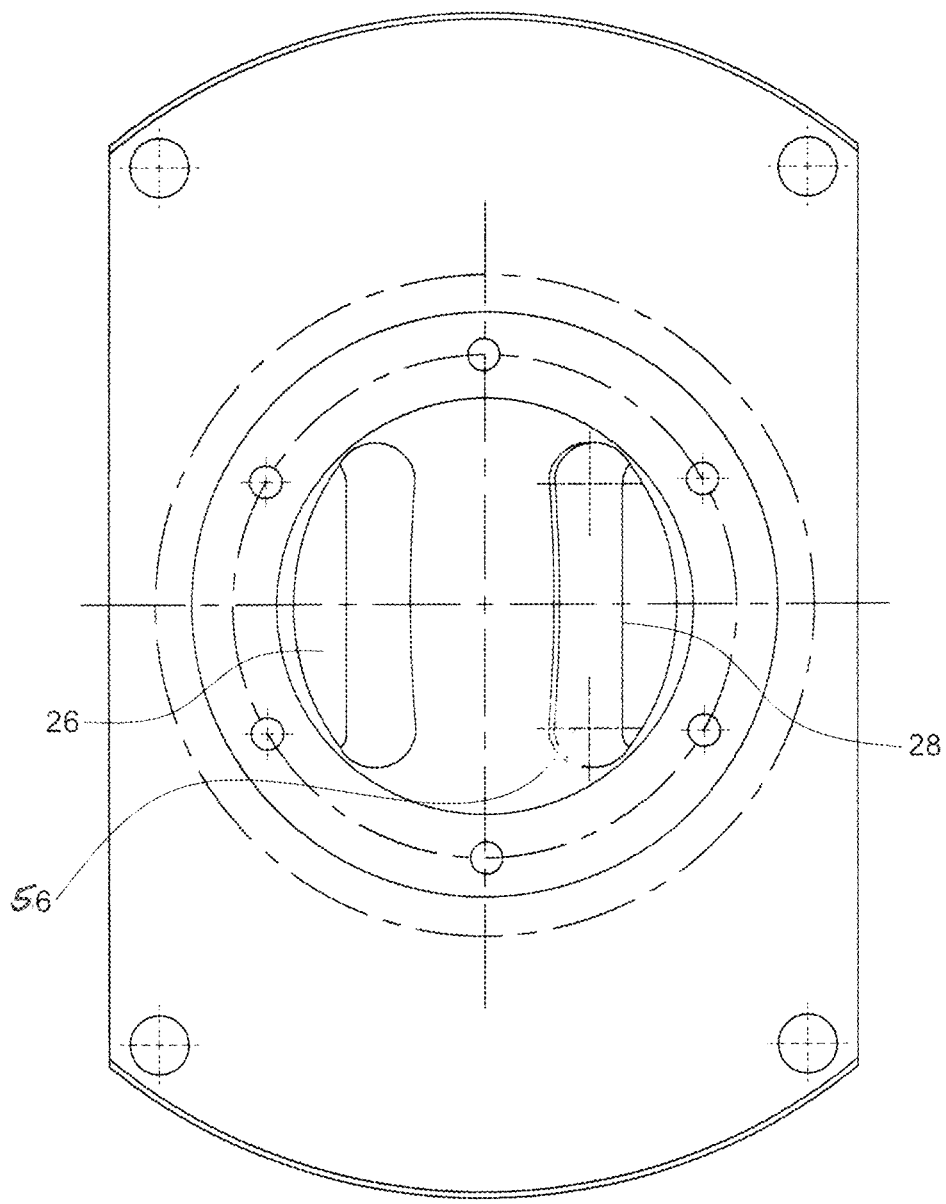
FIG. 11 is a top plan view of the relief cover utilized in FIG. 10.
Figure 12:
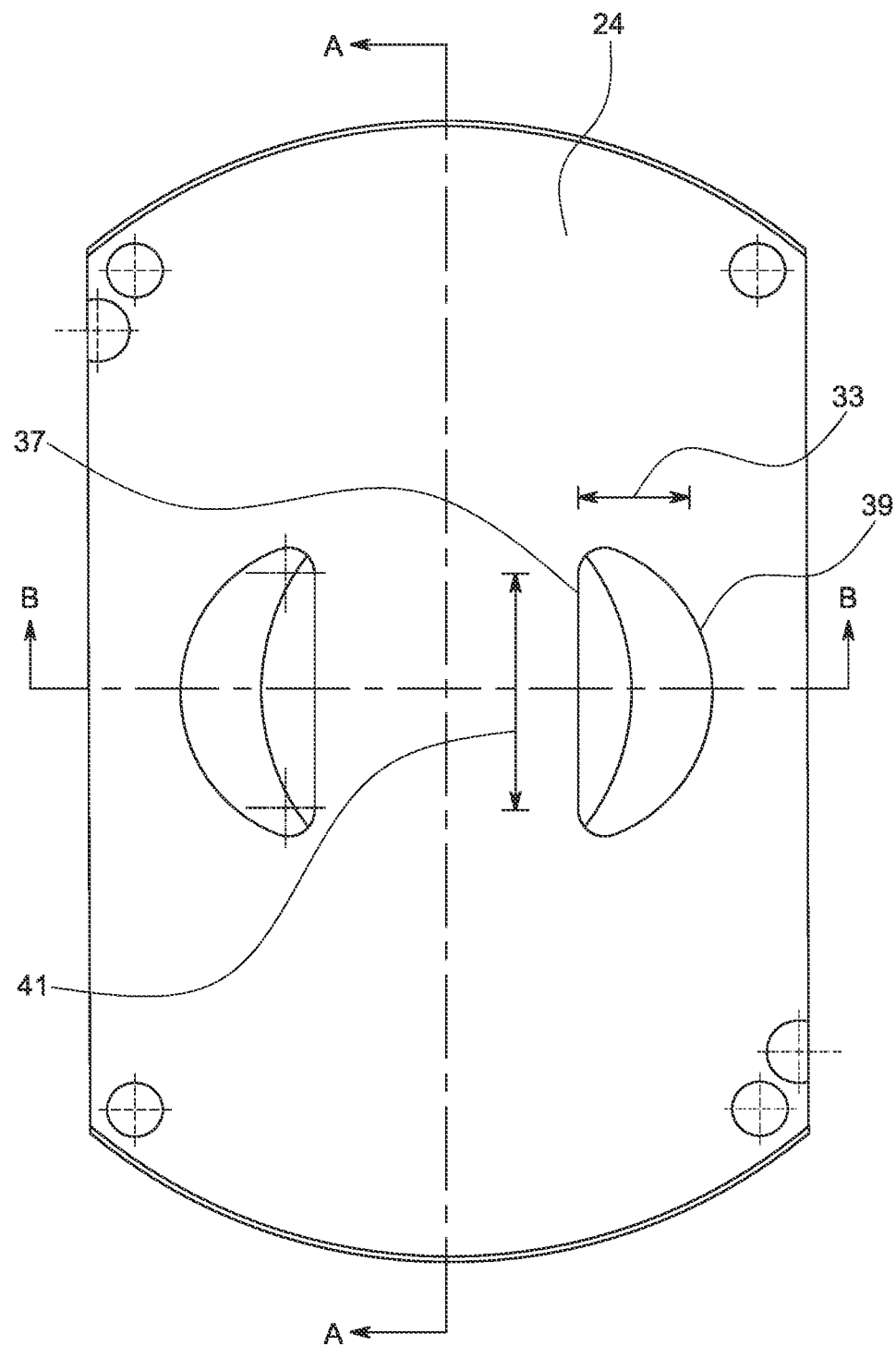
FIG. 12 is a bottom plan view of the relief valve of the preferred embodiment of FIG. 10.
Figure 13:
FIG. 13 is a cross-sectional view taken along the line AA of FIG. 12.

FIG. 10 shows the new valve 20 having many of the same components of the original bi-directional valve 1. Other valves may not be restricted by this constraint and have other components. One will quickly observe that the diaphragm 22 and the relief cover plate 24 are constructed differently than prior art designs. Cover plate 24 has inlet and outlet 26,28 which are completely interchangeable depending on the orientation of the pump 30 and its operation.

Figure 9:
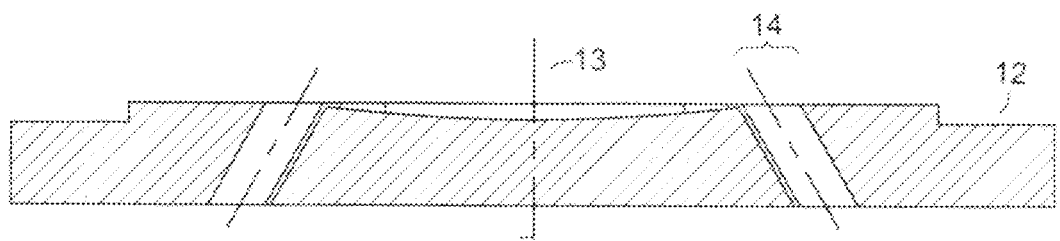
FIG. 9 is a cross-sectional view taken along the line BB of FIG. 7.
Figure 14:
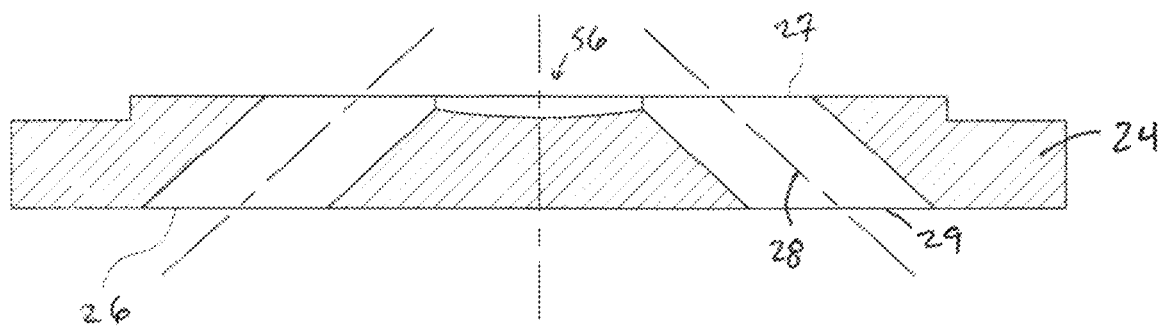
FIG. 14 is a cross-sectional view taken along the line BB of FIG. 10.

However, when comparing FIG. 14 to FIG. 9 of the relief covers 24 to 12, then the angles relative to verticals 32 and 13 are less acute with relief cover 24 than 12, Inlet/outlet 26,28 have angle with vertical 32 of 47° in FIG. 14. Angle of inlet/outlet 3,4 relative to vertical 13 is 30° in FIG. 9. Having an angle of less than about 45° has been found to improve flow.

Additionally, the cross-sectional surface area of the inlets and outlets 26,28 is greater than the prior art construction also contributing to greater flow and changing from 774 square millimeters of surface area (continuously) through the inlets and outlets 3,4 in a channel of substantially constant thickness 14 across a length 17 except at curved ends 15,16 as opposed to 1883 sqmm at the top 27 of the inlets and outlets 26,28 and 1845 sqmm at the bottom 29 of the inlets and outlets 26,28. The inlets/outlets 26,28 also have a different cross sectional shape, more of a bean shape of constantly changing thickness 33 along length 41 possibly with a substantially linear side 37 and a constantly curving opposite side 39 along length 41 providing a bean-like shape. The change in the configuration of the cover plate 24 in and of itself utilizing the old diaphragm 2 was not enough. Such a design had little to no impact on the overall relieving potential of the valve at a relief pressure of 60 psi, under certain conditions, and still further improvements were believed to be possible.

Figure 15:
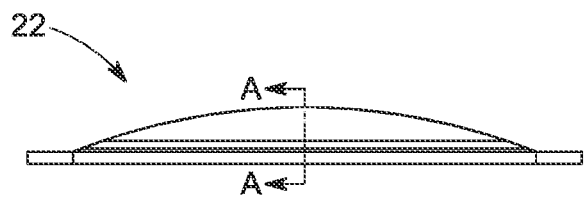
FIG. 15 is a side plan view of the diaphragm shown in FIG. 10.
Figure 16:
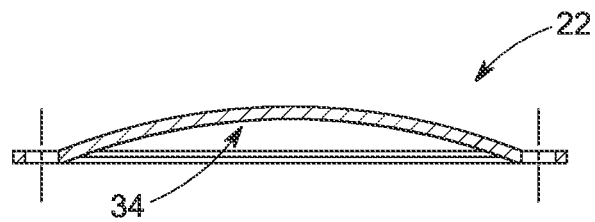
FIG. 16 is a cross-sectional view taken along line AA of FIG. 15.
Figure 17:
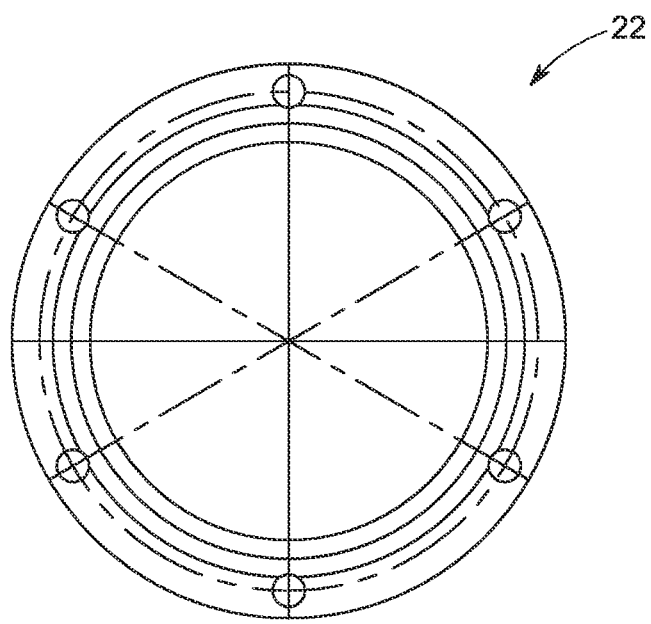
FIG. 17 is a top plan view of the diaphragm of FIGS. 15 and 16.
Figure 18:
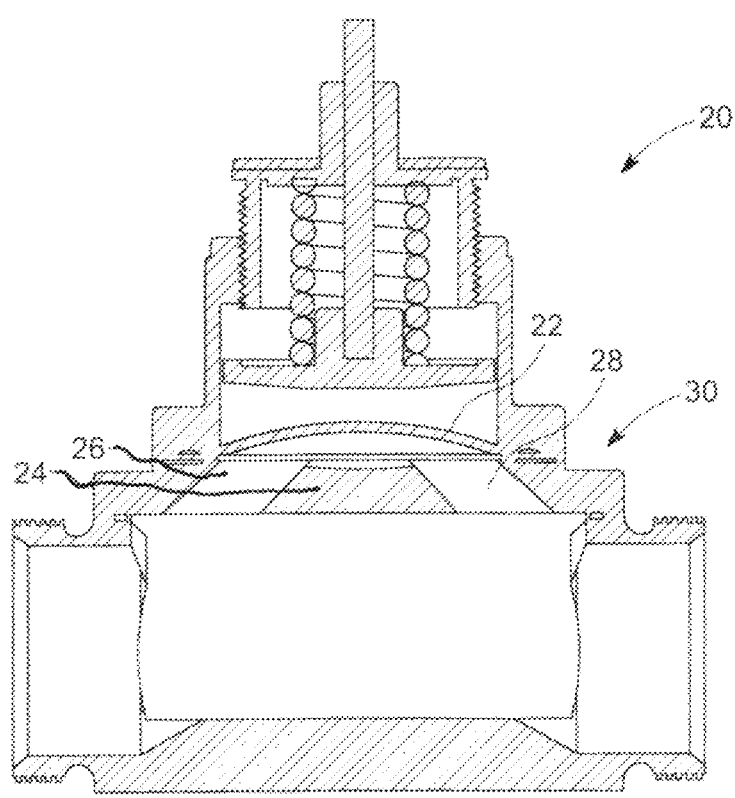
FIG. 18 is a cross-sectional view of the valve 10 shown installed on a pump similar to FIG. 1.

FIG. 15 shows a new diaphragm 22 having a convex inner-surface 34 which is downwardly pressed by the spring assembly 36 so that inter-surface 34 contacts and seals against seat 56 to prevent flow between the inlet and outlet 26,28 under a non-relief situation. The radius of this concavity is about 125-175 mm radius over an are of about 100-150 mm with a lip of about 15 mm (or whatever may be desired, if any, for the geometry of the valve 20). This diaphragm may be made of EDPM (ethylene, propylene, diene, monomer) or other appropriate material to have the desired characteristics desired by the applicant or particular user. By having a concave inner-surface 34 the pressure relief situation does lift as shown in FIGS. 10 and 18, a more accurate flow path can be achieved through the valve 20 thus a higher flow rates shown and describe below. Relief pressures may be pre-set and/or selectable depending on the embodiment.

Figure 20:
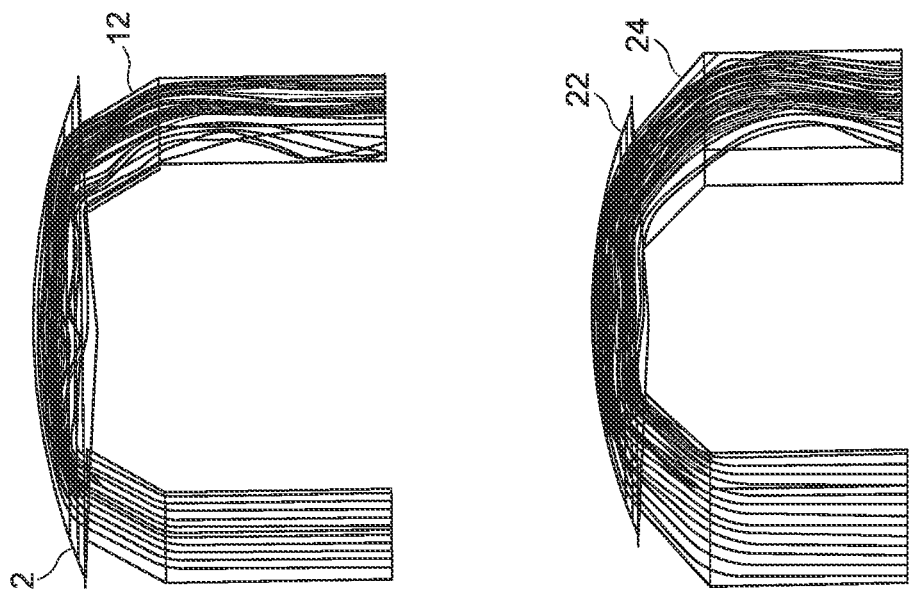
FIG. 20 is a particle trace diagram from a different view than FIG. 19.
Figure 19:
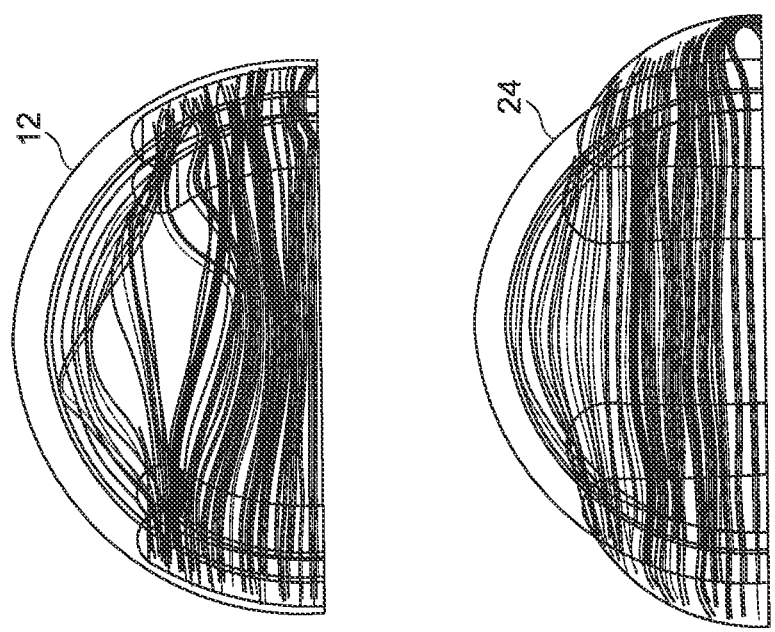
FIG. 19 is a particle trace diagram showing flow patterns of a prior art valve cover with the presently preferred diaphragm compared to the presently preferred embodiment valve.

Specifically, FIGS. 19 and 20 show a particle trace comparison maps of the flow between the new diaphragm 22 and the prior art relief cover 12 as opposed the new diaphragm 22 and new relief cover 24 from a top view of FIG. 19 and a side view of FIG. 20.

Figure 1:
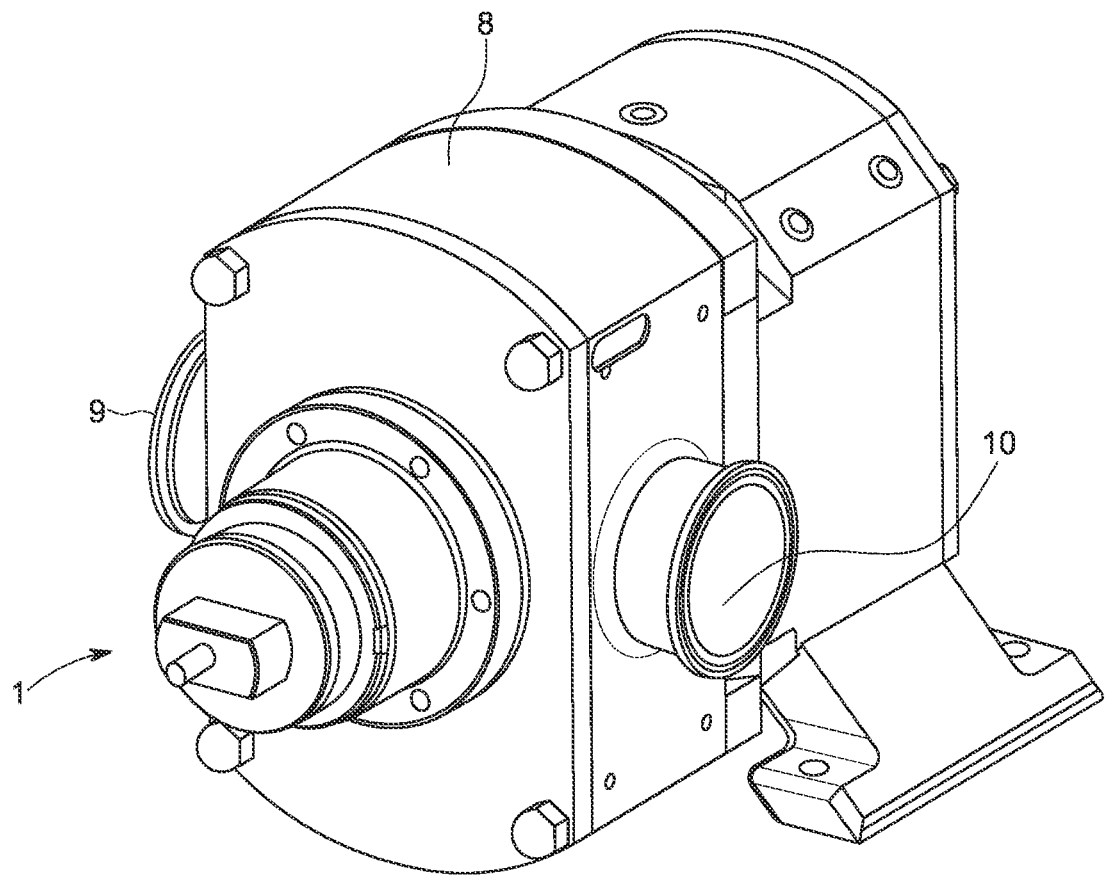
FIG. 1 is a perspective view of a prior art pump with an integral bi-directional valve.
Figure 2:
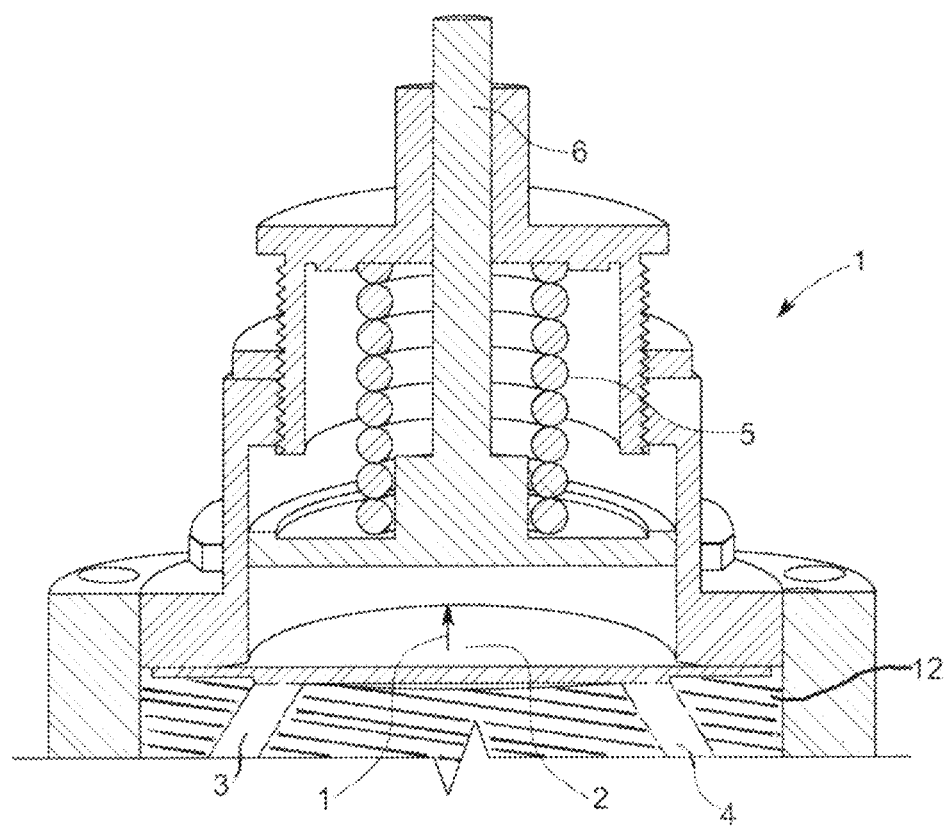
FIG. 2 is a cross-sectional view of the prior art bi-directional valve of FIG. 1.
Figure 3:
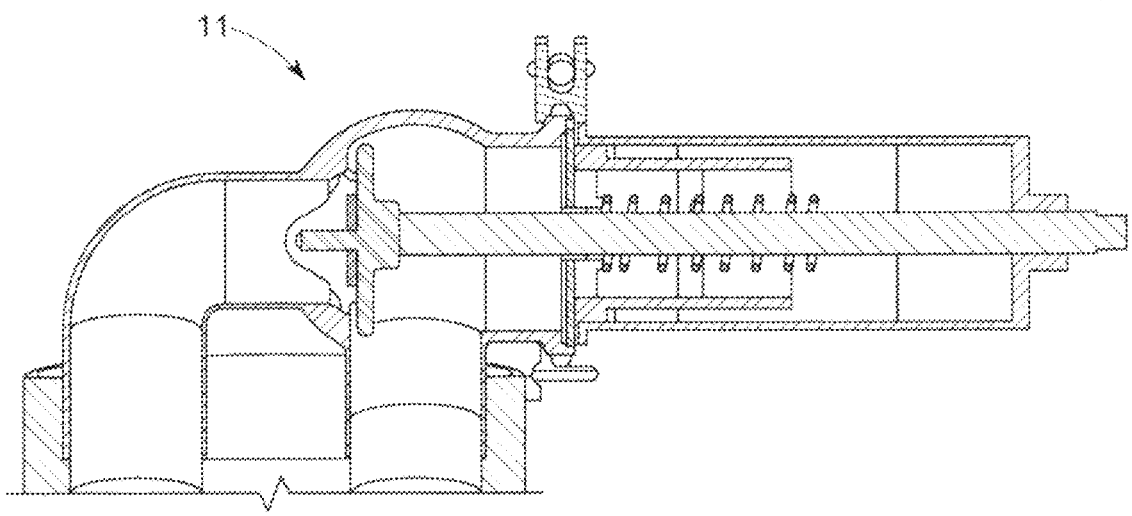
FIG. 3 is a cross-sectional view of a prior art uni-directional relief valve.
Figure 4:
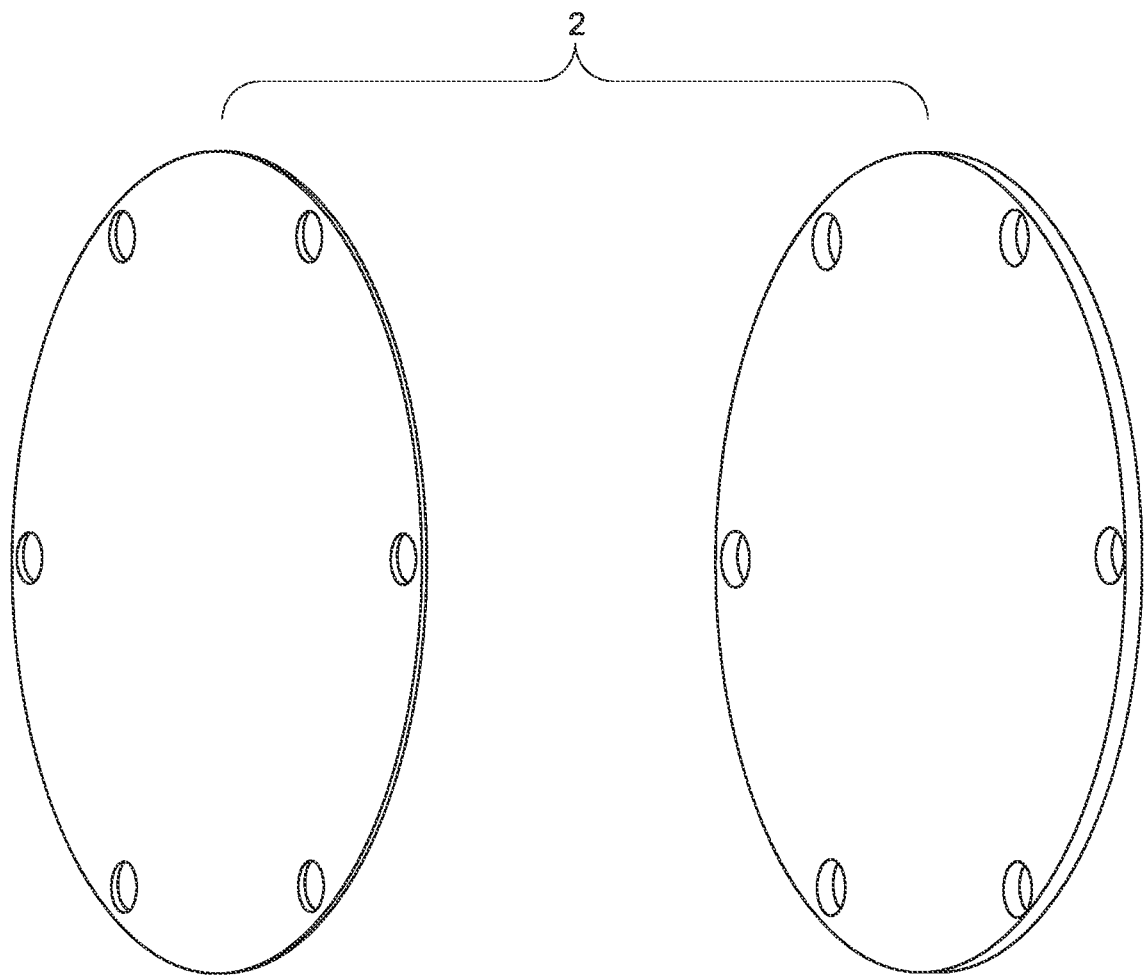
FIG. 4 is an exploded view of the diaphragm utilized in FIG. 2.
Figure 5:
FIG. 5 is a side plan view of the diaphragm utilized in FIG. 2.
Figure 6:
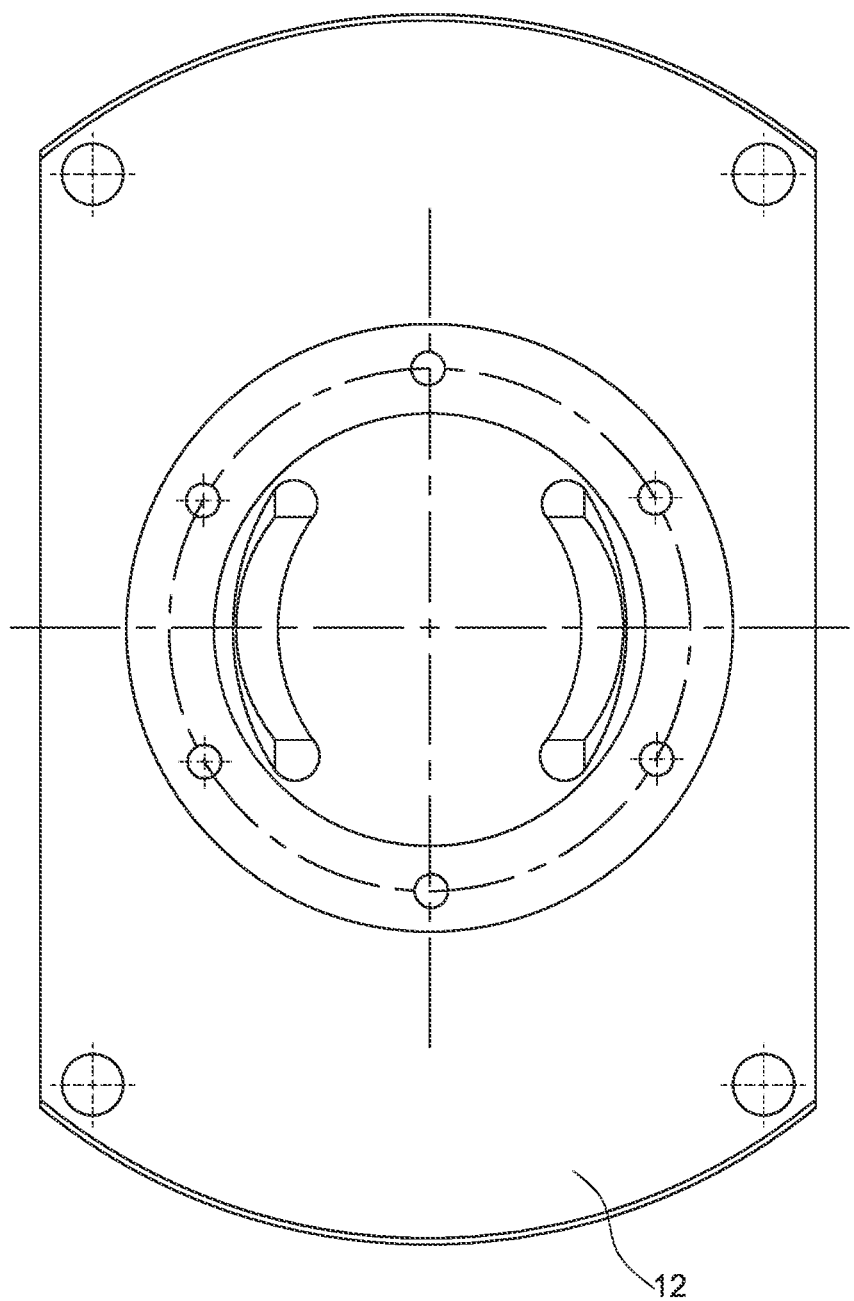
FIG. 6 is a top plan view of the prior art relief cover used in FIG. 2.
Figure 7:
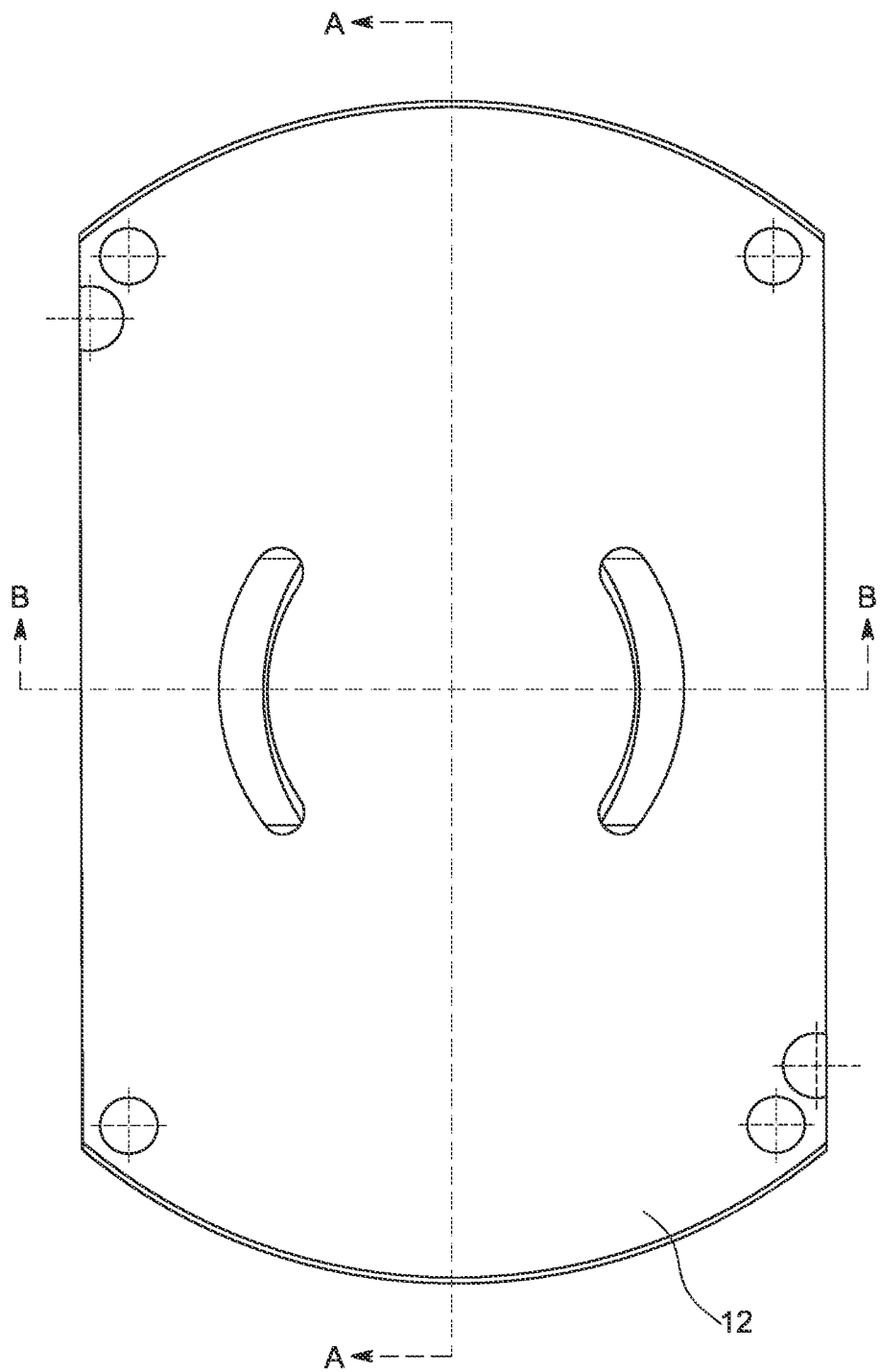
FIG. 7 is a bottom plan view of the prior art relief cover used in FIG. 2.
Figure 8:
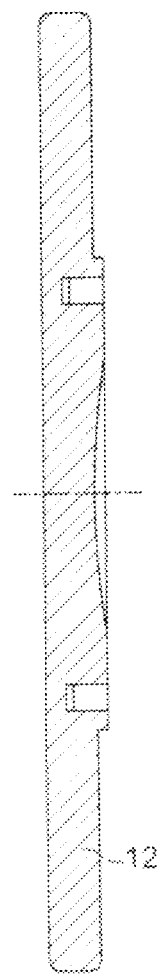
FIG. 8 is a cross-sectional view taken along the line AA of FIG. 7.
Figure 21:
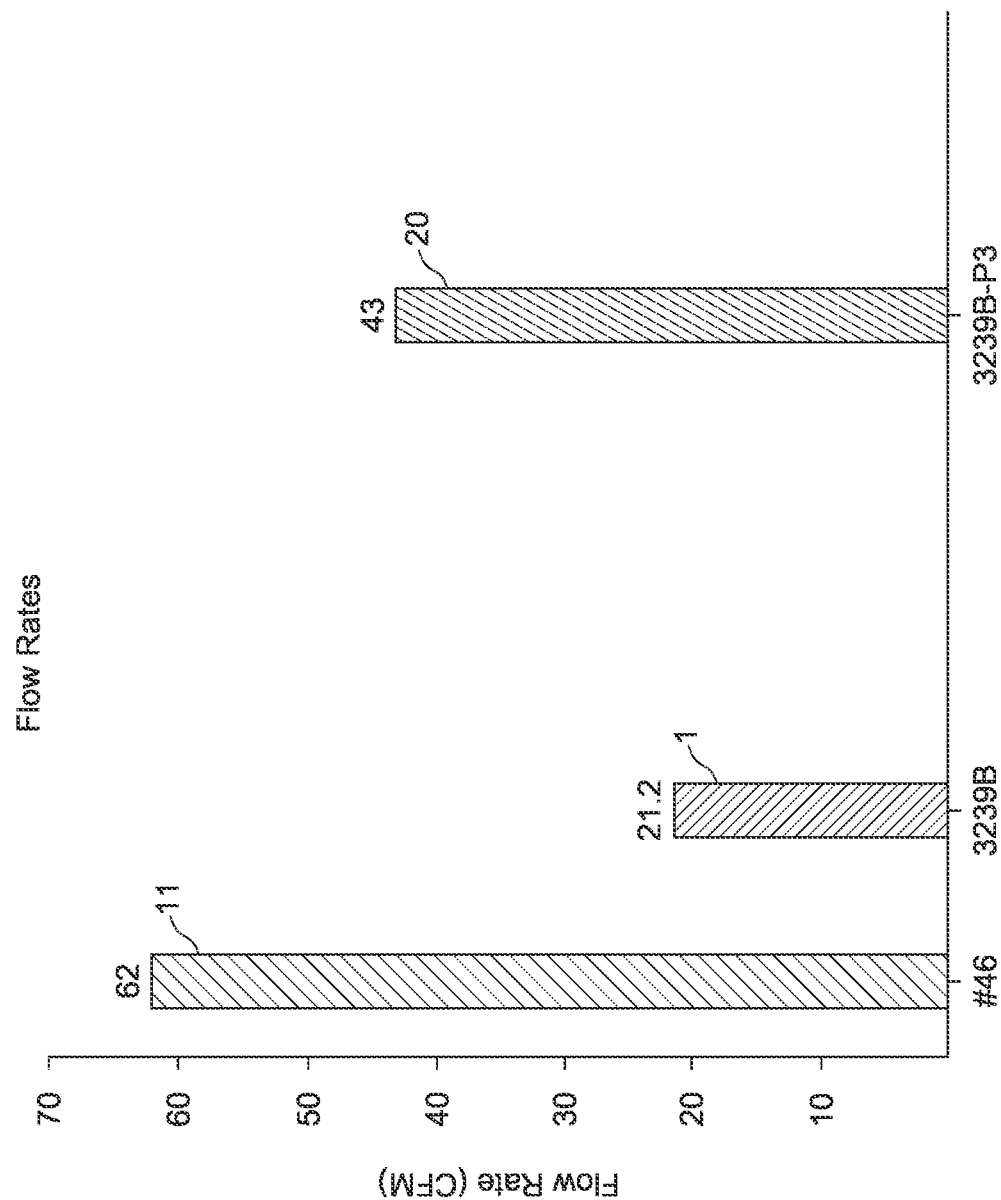
FIG. 21 is a bar graph showing simulated flow rates using the new bulb diaphragm.

FIG. 21 shows a graph of simulated flow rates of the prior art relief valve 11 of FIG. 3 compared to the various other designs including the old valve 1, and the new valve 20. The old valve 1 (with the old diaphragm 2) would not have performed as well as what is shown in this graph. Specifically, the uni-directional relief valve 11 is shown having a flow rate of 62 cubic feet per minute while the old bi-directional valve 1 (with new diaphragm 22) has a flow rate of 21 cubic feet per minute. The presently preferred embodiment of the present invention of the valve 20 has a flow rate of 43 cubic feet per minute.

Figure 22:
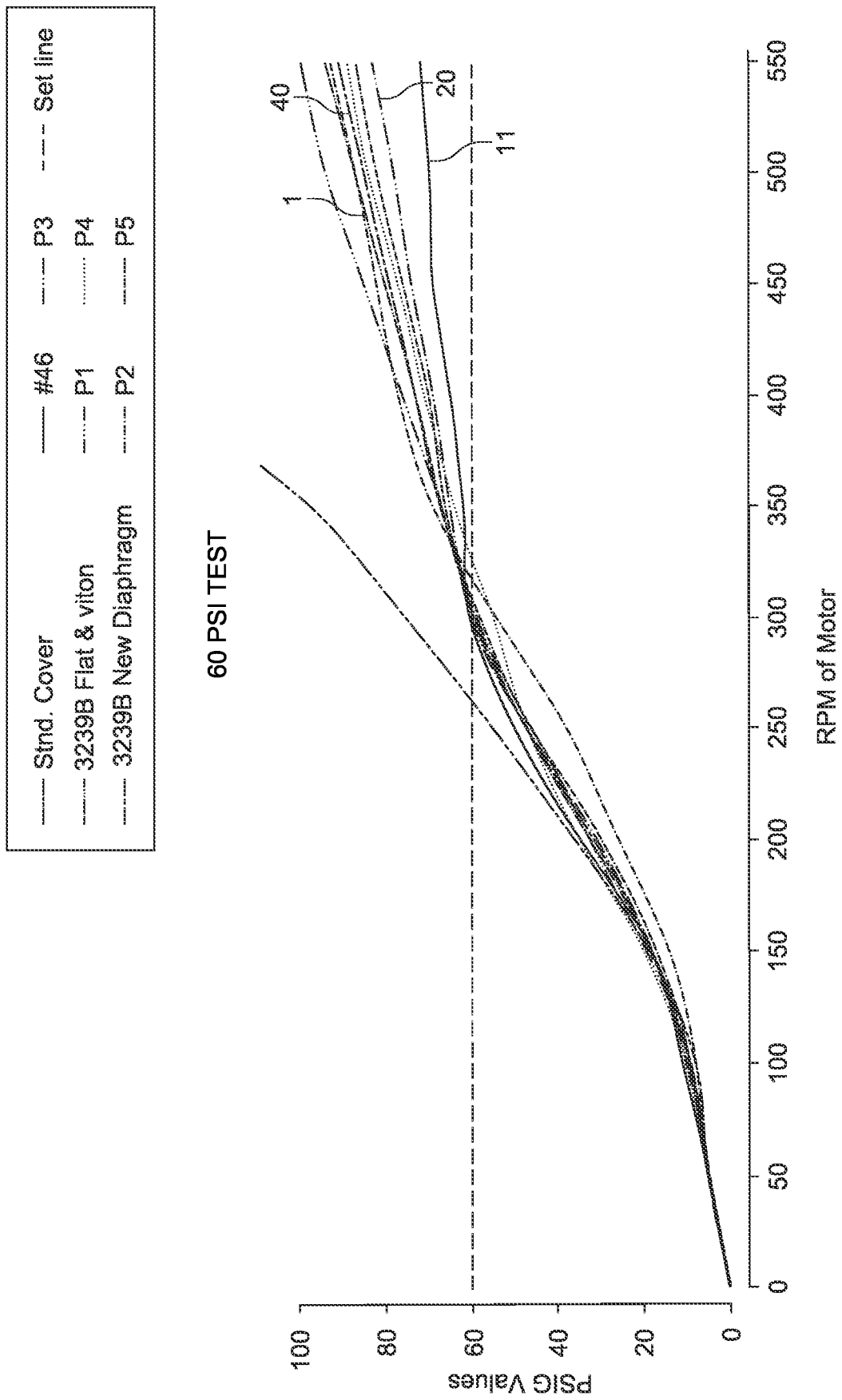
FIG. 22 is a graphic representation of performance of a prior art uni-directional relief valve, a prior art bi-directional relief valve, the prior art valve with new diaphragm, and the new valve with the diaphragm to compare performance.

FIG. 22 shows performance of various valves 1, 11, 20, 40 compared under similar test conditions with a 60 psi relief setting under various motor speeds. Just replacing the diaphragm 22 for 2 slightly improved performance using the old cover plate 12 to provide proposed valve 40, but swapping the new cover plate 24 and a new diaphragm 22 for valve 20 resulted in a marked improvement over the prior art design of valve 1, and much closer performance to the uni-directional valve 11. At 550 rpm, the old cover plate 12 and new diaphragm 22 (proposed valve 40) only increased performance about 1%, whereas the new cover plate 24 with new diaphragm 22 (valve 20) increased performance 4% (as opposed to the 9% difference of the uni-directional valve 11).

The combination of the new diaphragm 22 with a new relief cover 24 doubled the flow rate of the prior art bi-directional relief valve in a relief configuration which is believed to be beneficial for at least some embodiments. Various materials can be utilized to manufacture the diaphragm 22 and/or relief cover 24 as would be understood by those of ordinary skill in the art.

For the applicant's design constraints, many of the old parts were desired to be utilized with the new design while increasing the performance. This may not be the case for all embodiments. It may be that other components such as springs and/or other components may be replaced even furthering increased flow rates and/or change other characteristics for other embodiments.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A bi-directional relief valve comprising: a valve inlet and a valve outlet between a pump inlet and a pump outlet, with the valve operating similarly regardless which of the valve inlet and valve outlet is selected to be connected to a potential pressure source;

a biasing member applying a bias force to a diaphragm whereby the diaphragm seals against a substantially planar cover plate in a non-relieving configuration preventing flow from the valve inlet to the valve outlet until reaching a relief pressure;

wherein upon reaching the relief pressure, the bias force is sufficiently offset to permit the diaphragm to move away from the cover plate permitting flow from the valve inlet through the valve outlet and out the pump outlet in a relieving configuration; the substantially planar cover plate comprising symmetrically oriented ports through the substantially planar cover plate, said ports each having a linear front face directed toward a middle of the cover plate parallel to one another, with said ports oriented at less than an angle of 45 degrees relative to a plane of the cover plate through the cover plate, and wherein the diaphragm is preformed in a dome shape with the concave side facing the cover plate and deflects to seal the valve inlet relative to the valve outlet in the non-relieving configuration and moves toward being concave in the relieving configuration above the cover plate.

2. The bi-directional valve of claim 1 wherein the ports each have a curved rear face with the front face spaced intermediate the curved rear face and a center of the cover plate.

3. The bi-directional valve of claim 1 wherein the pressure of fluid at the diaphragm in the relieving configuration is within 20% of the relief pressure until the diaphragm resets securing flow from the valve inlet to the valve outlet.

4. A bi-directional relief valve comprising: a valve inlet and a valve outlet between a pump inlet and a pump outlet, with the valve operating similarly regardless which of the valve inlet and valve outlet is selected to be connected to a potential pressure source;

a biasing member applying a bias force to a diaphragm whereby the diaphragm seals against a cover plate in a non-relieving configuration preventing flow from the valve inlet to the valve outlet until reaching a relief pressure;

wherein upon reaching the relief pressure, the bias force is sufficiently offset to permit the diaphragm to move away from the cover plate permitting flow from the valve inlet through the valve outlet and out the pump outlet in a relieving configuration; symmetric ports in the cover plate, each port having a maximum cross section thickness at a middle of the port as located perpendicular to a center of the cover plate between the ports and the cross section of each port narrows as the port extends outwardly from the middle toward the outer edges of the port, with said ports oriented at less than an angle of 45 degrees relative to a plane of the cover plate through the cover plate, and wherein the diaphragm is preformed in a dome shape with the concave side facing the cover plate and deflects to seal the valve inlet relative to the valve outlet in the non-relieving configuration and moves toward being concave in the relieving configuration above the cover plate.

5. The bi-directional valve of claim 4 wherein said ports each having a linear front face directed toward a middle of the cover plate parallel to one another.

6. A bi-directional relief valve comprising: a valve inlet and a valve outlet between a pump inlet and a pump outlet, with the valve operating similarly regardless which of the valve inlet and valve outlet is selected to be connected to a potential pressure source;

a biasing member applying a bias force to a diaphragm whereby the diaphragm seals against a substantially planar cover plate in a non-relieving configuration preventing flow from the valve inlet to the valve outlet until reaching a set relief pressure;

wherein upon reaching the relief pressure, the bias force is sufficiently offset to permit the diaphragm to move away from the cover plate permitting flow from the valve inlet through the valve outlet in a relieving configuration with flow continuing out the pump outlet; symmetrical oriented ports through the substantially planar cover plate communicate the valve inlet and valve outlet to the diaphragm with said ports oriented at less than an angle of 45 degrees relative to a plane of the cover plate, said ports each having a linear front face directed towards a middle of the cover plate parallel to one another, a maximum cross section thickness at a middle of the port as located perpendicular to a center of the cover plate between the ports, and the cross section of each port narrows as the port extends outwardly from the middle of the port toward the outer edges of the port, and wherein the diaphragm is preformed in a dome shape with the concave side facing the cover plate and deflects to seal the valve inlet relative to the valve outlet in the non-relieving configuration and moves toward being concave in the relieving configuration above the cover plate.

7. The bi-directional valve of claim 6 wherein the ports in the cover plate are oriented at about 30 degrees relative to the plane of the cover plate.

8. The bi-directional valve of claim 7 wherein the ports each have a curved rear face with the front face spaced intermediate the rear face and the center of the cover plate.

9. The bi-directional valve of claim 6 wherein the pressure of fluid at the diaphragm in the relieving configuration is within 10% of the relief pressure until the diaphragm resets securing flow from the valve inlet to the valve outlet.

10. The bi-directional valve of claim 9 wherein the pressure of fluid at the valve outlet in relieving configuration is within 20% of the relief pressure until the diaphragm resets securing flow from the valve inlet to the valve outlet.

11. The bi-directional valve of claim 6 wherein the relief pressure is pre-set.

12. The bi-directional valve of claim 6 wherein the relief pressure is selectable.

13. The bi-directional valve of claim 6 wherein the relief pressure is one of pre-set and selectable.

14. A bi-directional relief valve comprising: a valve inlet and a valve outlet between a pump inlet and a pump outlet, with the valve operating similarly regardless which of the valve inlet and valve outlet is selected to be connected to a potential pressure source;

a biasing member applying a bias force to a diaphragm whereby the diaphragm seals against a planar cover plate in a non-relieving configuration preventing flow from the valve inlet to the valve outlet until reaching a relief pressure;

wherein upon reaching the relief pressure, the bias force is sufficiently offset to permit the diaphragm to move away from the cover plate permitting flow from the valve inlet through the valve outlet and out the pump outlet in a relieving configuration; symmetrically oriented ports through the planar cover plate, wherein said diaphragm is preformed in a concave shape as oriented toward the cover plate and deflected to seal the valve inlet relative to the valve outlet in the non-relieving configuration and moves toward being concave in the relieving configuration above the cover plate, with said ports oriented at less than an angle of 45 degrees relative to a plane of the cover plate and extending completely through the cover plate at the angle, and wherein said ports each having a linear front face directed toward a middle of the cover plate parallel to one another, a maximum cross section at a middle of the port as located perpendicular to a center of the cover plate between the ports, the cross section of each port narrows as the port extends outwardly from the middle of the port toward outer edges of the port.

\* \* \* \* \*